(12) United States Patent
Bigsby

(10) Patent No.: US 6,662,915 B2
(45) Date of Patent: Dec. 16, 2003

(54) HYDRAULIC PARK BRAKE BOOSTER MECHANISM

(75) Inventor: Bryan D. Bigsby, Evans, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/087,591

(22) Filed: Mar. 1, 2002

(65) Prior Publication Data

US 2003/0164642 A1 Sep. 4, 2003

(51) Int. Cl.$^7$ ................................................ F16B 55/00
(52) U.S. Cl. ........................................ 188/359; 74/512
(58) Field of Search ...................... 74/512, 513, 514, 74/473.11, 473.16; 188/73.31, 72.1, 71.1, 111, 265, 358, 359; 303/1

(56) References Cited

U.S. PATENT DOCUMENTS

| | | | | |
|---|---|---|---|---|
| 4,218,936 A | * | 8/1980 | Waggoner | 74/512 |
| 4,278,143 A | * | 7/1981 | Nagai | 74/512 |
| 4,301,901 A | * | 11/1981 | Jensen | 74/512 |

* cited by examiner

*Primary Examiner*—Matthew C. Graham
(74) *Attorney, Agent, or Firm*—Harness, Dickey & Pierce, P.L.C.

(57) ABSTRACT

A brake assembly is provided for implementation with a brake system and includes a support bracket, a master cylinder supported by the support bracket and operable to provide hydraulic pressure to the brake system, an accumulator piston extending from the master cylinder and operable to maintain hydraulic pressure within the hydraulic brake system, and an accumulator assembly extending from the support bracket. The accumulator assembly includes a compression plate engaging the accumulator piston, an end cap and an accumulator spring disposed between the compression plate and the end cap, biasing the compression plate against the accumulator piston. A booster arm is pivotally supported by the support bracket and is actuable between first and second positions. In the first position the booster arm limits axial movement of the compression plate against the accumulator piston and in the second position the booster arm permits increased axial movement thereof.

19 Claims, 8 Drawing Sheets

HYDRAULIC PARK BRAKE BOOSTER MECHANISM

FIELD OF THE INVENTION

The present invention relates to hydraulic brake systems and more particularly to a booster mechanism for park brakes of hydraulic brake systems.

BACKGROUND OF THE INVENTION

Hydraulic brake systems are implemented in a number of vehicles, including automobiles and golf carts. To function, such brake systems rely on fluid pressure within the system to actuate a single brake or multiple brakes. In essence, a master cylinder is selectively actuated by a brake pedal, whereby a brake piston of the master cylinder induces fluid pressure within the brake system, thereby actuating the brakes. Most vehicles include a park brake for continuous engagement of the brakes over an extended period of time. In this manner, a vehicle may be at rest with the brakes prohibiting rolling. Typically, the park brake includes a mechanically actuated brake functioning independently from the hydraulic brake system. However, it is known in the art to incorporate a park brake with the hydraulic brake system. Examples of such a system for a golf cart can be found with reference to U.S. patent application Ser. No. 09/846,031, filed Apr. 30, 2001; U.S. patent application Ser. No. 09/517,302, filed Mar. 2, 2000, now U.S. Pat. No. 6,223,865 B1, which claims the benefit of U.S. Provisional Serial No. 60/122,405, filed Mar. 2, 1999, all of which are assigned to the assignee of the present invention. The disclosures of the above are incorporated by reference.

One fundamental problem with park brake incorporating hydraulic brake systems is that the hydraulic fluid experiences significant density and therefore volume changes as the temperature of the surrounding environment changes. For example, a constant mass of hydraulic fluid expands, becoming less dense and encompassing more volume at a higher temperature and contracts, becoming more dense and encompassing less volume at a lower temperature. Such fluctuations in the hydraulic fluid characteristics may result in reduced fluid pressure within the brake system, causing the park brake to be insufficient for engaging the brakes.

To remedy this situation existing brake systems include an energy accumulator which stores energy that is later used to compensate for such pressure losses. Generally, the accumulator includes a secondary or accumulator piston in fluid communication with the hydraulic brake system and biased by a spring. When the park brake is applied, the accumulator piston compresses the spring a distance, and the fluid pressure within the brake system holding the spring is compressed. As fluid density decreases, such as with a temperature drop over seasonal changes, system pressure losses are compensated for by the spring biasing the accumulator piston, with the accumulator piston maintaining the system pressure. However, as soon as the spring achieves full extension, or bottoms out against a fixed object, it is no longer able to bias the accumulator piston and thus, no longer maintain system pressure.

It is therefore desirable to provide a mechanism for enabling increased spring extension range. In this manner, the accumulator piston is able to maintain system pressure over a longer period of time and within environments of significantly decreasing temperatures.

SUMMARY OF THE INVENTION

Accordingly, the present invention provides a brake assembly for implementation with a hydraulic brake system. The brake assembly includes an accumulator piston in fluid communication with the hydraulic brake system to maintain hydraulic pressure therewithin, an accumulator assembly operably engaging the accumulator piston and including a compression plate engaging the accumulator piston and an accumulator spring biasing the compression plate against the accumulator piston, and a booster arm pivotally supported by one of the support bracket and the master cylinder, and actuable between first and second positions, wherein in the first position the booster arm limits axial movement of the compression plate against the accumulator piston and wherein in the second position the booster arm permits increased axial movement of the compression plate against the accumulator piston.

More particularly, the present invention provides a brake assembly for implementation with a hydraulic brake system. The brake assembly includes a support bracket, a master cylinder supported by the support bracket and operable to selectively provide hydraulic pressure to the hydraulic brake system, an accumulator piston extending from the master cylinder and operable to enable function of the master cylinder. The accumulator piston is operable to maintain hydraulic pressure within the hydraulic brake system. An accumulator assembly is included and extends from the support bracket. The accumulator assembly has a compression plate engaging the accumulator piston, an end cap and an accumulator spring disposed between the compression plate and the end cap and biasing the compression plate against the accumulator piston. A booster arm is pivotally supported by one of the support bracket and the master cylinder, and is actuable between first and second positions, wherein in the first position the booster arm limits axial movement of the compression plate against the accumulator piston and wherein in the second position the booster arm permits increased axial movement of the compression plate against the accumulator piston.

In the first position, the booster arm defines a normal "bottom-out" position of the compression plate, whereby the compression plate is unable to further act on the accumulator piston due to the biasing force of the accumulator spring. In the second position, the booster arm is rotated away from limiting axial movement of the compression plate, defining a new "bottom-out" position of the compression plate, thereby enabling increased distance for the compression plate to act on the accumulator piston.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
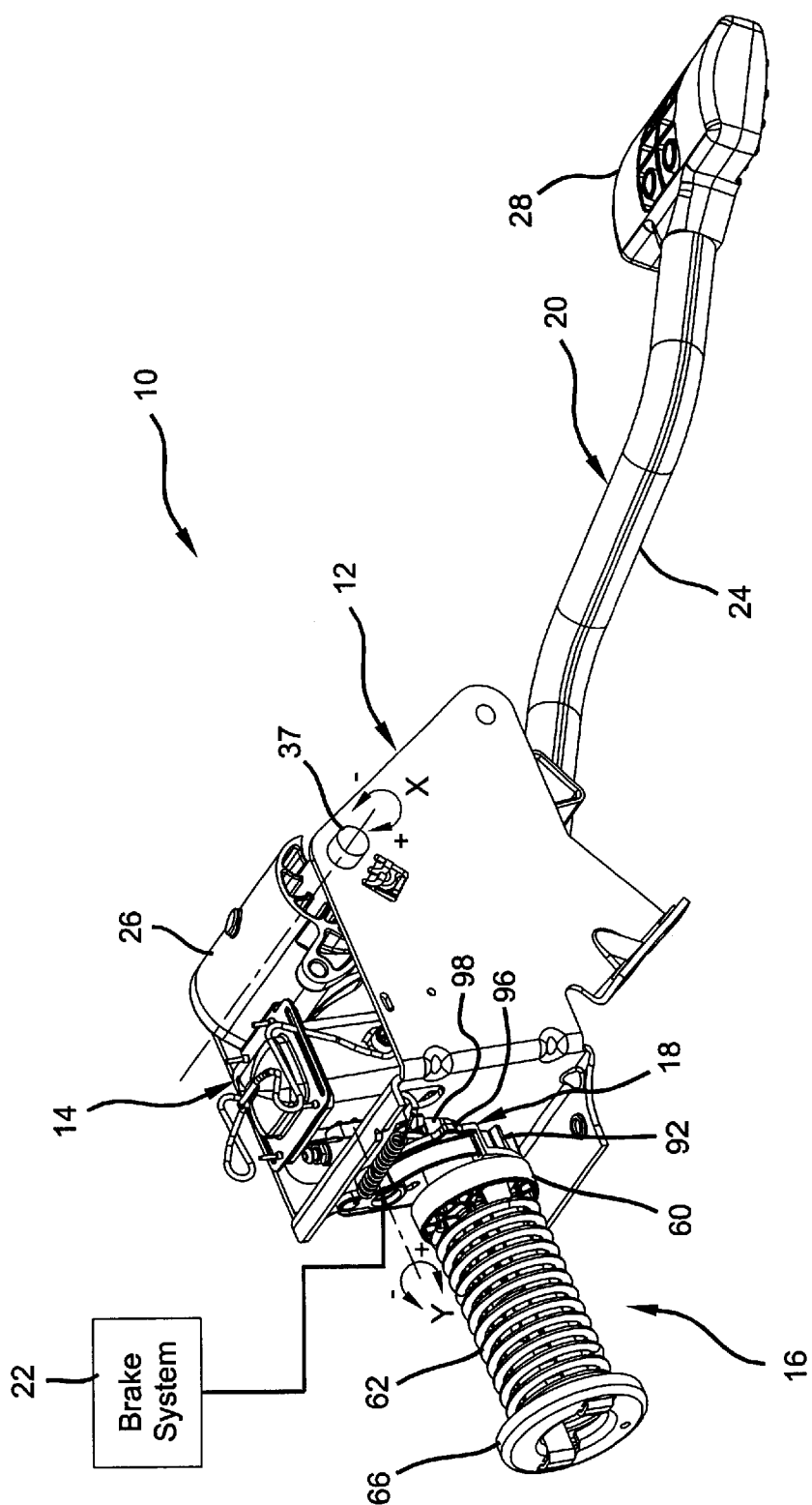
FIG. 1 is a perspective view of a bra e assembly in accordance with the principles of the present invention.
Figure 2:
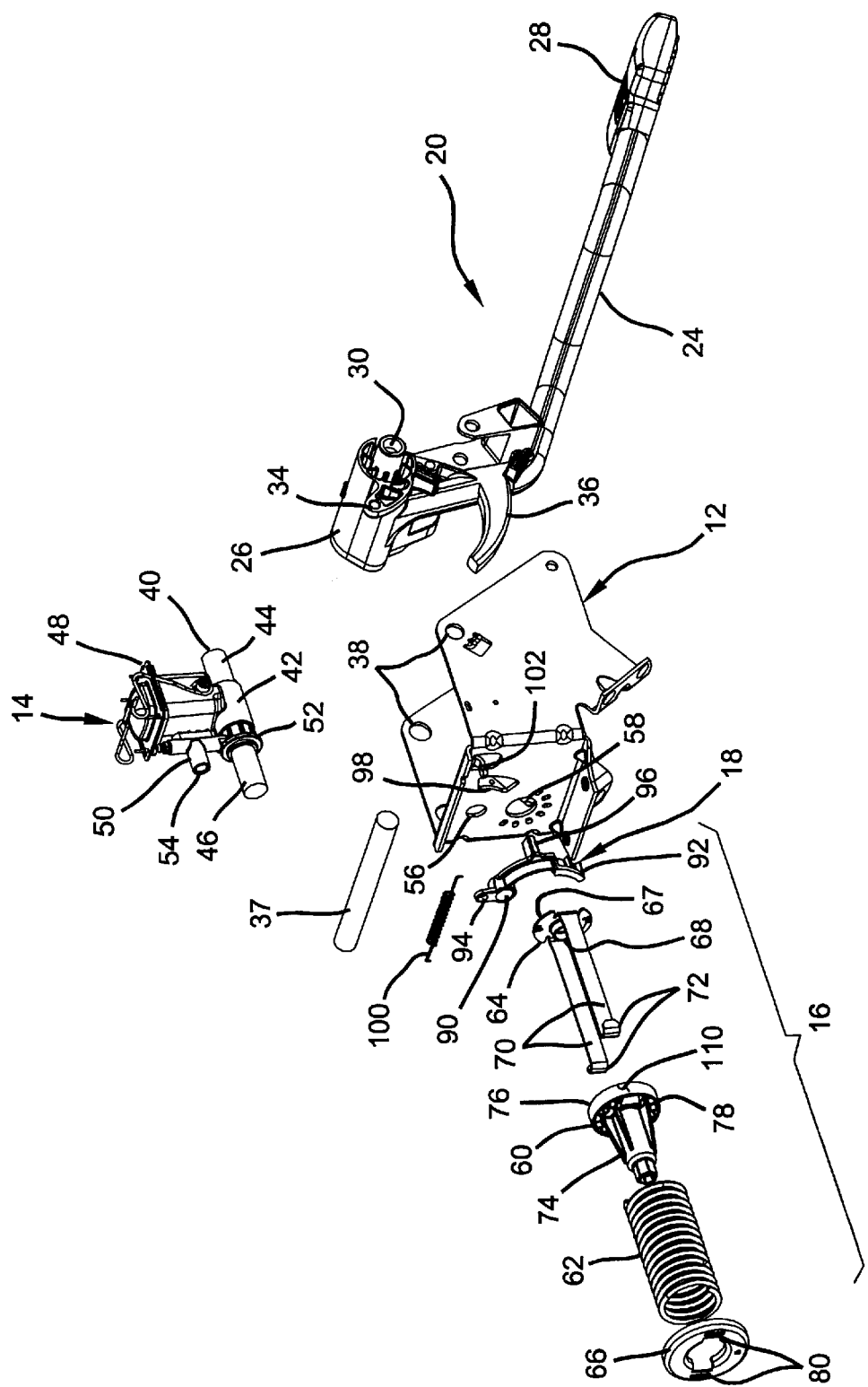
FIG. 2 is an exploded view of the brake assembly of FIG. 1.

The following description of the preferred embodiment is merely exemplary in nature and is in no way intended to limit the invention, its application, or uses.

With reference to the figures, the present invention provides a brake assembly 10 including a support bracket 12, a master cylinder 14, an accumulator assembly 16, a booster arm 18 and a brake arm 20. The brake assembly 10 is generally implemented within a vehicle (not shown), such as, but not limited to an automobile (combustion engine, electric or hybrid), a golf cart, or the like. The brake assembly 10 is actuable in three general modes: non-braking; braking and park-brake (each of which is described in further detail below). The brake arm 20 is in mechanical communication with the master cylinder 14 and is selectively actuable by an external force (e.g. operator depressing). The master cylinder 14 is in fluid communication with a brake system 22 and is selectively actuable by the brake arm 20. Further, the master cylinder 14 is in mechanical communication with the accumulator assembly 16. The accumulator assembly 16 biases components of the master cylinder 14 to compensate for pressure losses in the brake system 22 (generally occurring during the park-brake mode), as described in further detail hereinbelow. The booster arm 18 is selectively actuable by the brake arm 20 for selectively engaging the accumulator assembly 16. An external park brake latch (not shown) is also provided and in mechanical communication with the brake assembly 10 for retaining the brake assembly 10 in the park-brake mode, as described further hereinbelow.

Figure 4:
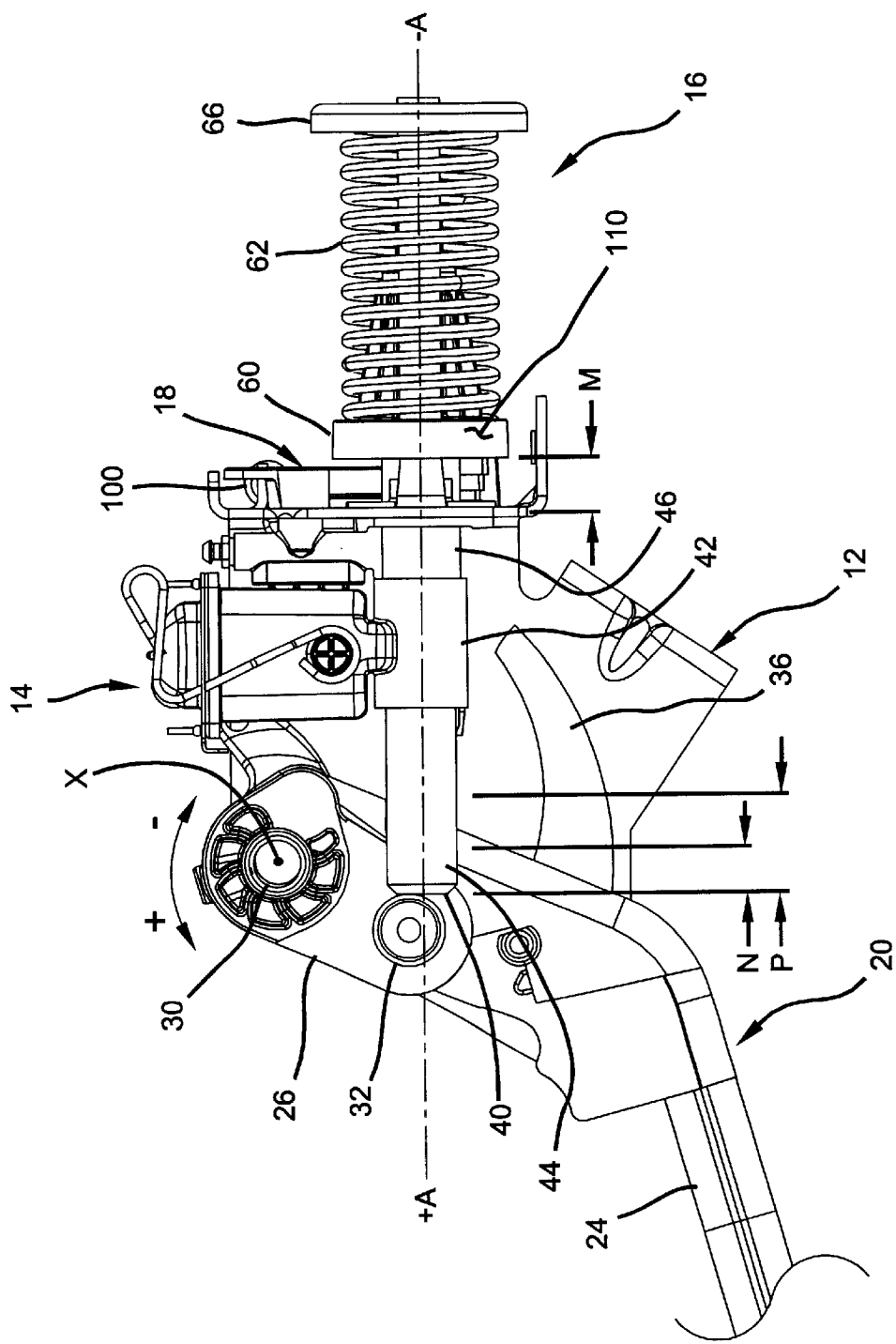
FIG. 4 is a side view of the brake assembly, opposite that of FIG. 3, including a cut-away portion showing the non-braking mode of the brake assembly.

The brake arm 20 includes an intermediate arm 24 disposed between a support structure 26 and a pedal 28. The pedal 28 is generally provided as the force application point for actuation of the brake arm 20. The support structure 26 includes a pivot aperture 30 running therethrough, a brake engagement roller 32 (see FIG. 4), a bias spring anchor arm 34 and a curved actuation arm 36 extending therefrom. The brake arm 20 is pivotally supported by the support bracket 12, whereby a pivot pin 37 runs through the pivot aperture 30 and is supported through apertures 38 of the support bracket 12. The brake arm 20 is pivotal about a pivot axis X (having positive (+) and negative (−) rotational directions). A bias spring (not shown) is anchored between the bias spring anchor arm 34 and a vehicle support structure (not shown), thereby biasing the brake arm 20 in the −X direction. The brake engagement roller 32 engages a face 40 of the master cylinder 14 for selective actuation thereof and the curved actuation arm 36 selectively engages the booster arm 18, as described in further detail herein.

The master cylinder 14 includes a cylinder housing 42, a brake piston 44, an accumulator piston 46, a fluid reservoir 48 and a port housing 50. The master cylinder 14 is supported by the support bracket 12, whereby an end 52 of the cylinder housing 42 and a fluid port 54 are received through respective apertures 56, 58 of the support bracket 12. The brake piston 44 is slidably supported within the cylinder housing 42 and includes the face 40 that engages the roller 32 of the brake arm 20. The accumulator piston 46 is also slidably supported within the cylinder housing 42 and includes an end engaging the accumulator assembly 16. As is shown, the brake and accumulator pistons 44,46 extend from opposite sides of the cylinder housing 42. The fluid port 54 is in fluid communication with the brake system 22 for selectively transferring fluid pressure thereto. The brake piston 44 is actuable to selectively build fluid pressure for transfer to the brake system 22 through the fluid port 54. The accumulator piston 46 is actuable by the accumulator assembly 16 to maintain fluid pressure within the brake system 22 during the park-brake mode, as more fully described hereinbelow. An axis A is defined, along which both the brake piston 44 and accumulator piston 46 slide in either a positive (+) or negative (−) direction.

The accumulator assembly 16 includes a compression plate 60, an accumulator spring 62, a retainer bracket 64 and an end cap 66. The retainer bracket 64 includes an end plate having a central aperture 68 therethrough and bracket arms 70 extending therefrom. The bracket arms 70 each include formed hooks 72 at their distal ends. The compression plate 60 includes a generally conical shaped body 74 having a disc-shaped plate 76 formed at one end. Apertures 78 are formed through the disc-shaped plate 76. The retainer bracket 64 is attached to the support bracket 12 and extends outward therefrom. The central aperture 68 of the retainer bracket 64 is aligned with the aperture 56 of the support bracket 12 and the accumulator piston 46 is received through each. The compression plate 60 is slidably supported by the retainer bracket 64, whereby the bracket arms 70 are received through the apertures 78 of the disc-shaped plate 76. The accumulator piston 46 extends into a hollow interior of the compression plate 60 and is engaged therewith. It should be noted that the accumulator piston 46 may be fixedly attached to the compression plate 60, however, such attachment is not strictly required. The spring 62 is received about the bracket arms 70 and the end cap 66 is attached to the retainer bracket 64, whereby the hooks 72 engage respective apertures 80 of the end cap 66. In this manner, the spring 62 is retained between the end cap 66 and the compression plate 60, engaging a face of the compression plate 60. It should be noted that the various components of the accumulator assembly 16 are generally aligned along the common axis A. The spring 62 biases movement of the compression plate 60 along the retainer bracket 64 in the +A direction and biases against movement of the compression plate 60 in the −A direction.

Figure 3:
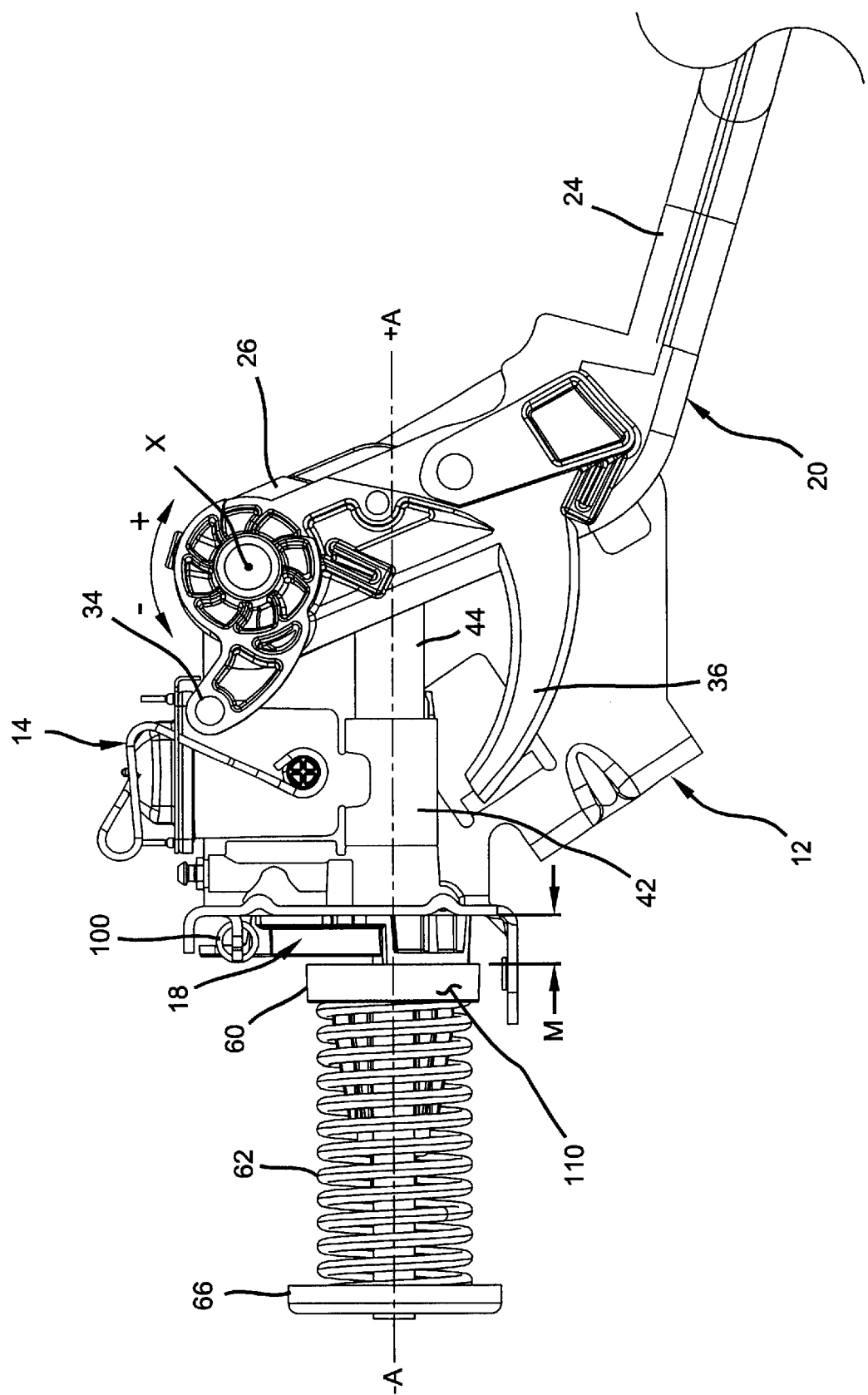
FIG. 3 is a side view of the brake assembly including a cut-away potion showing a non-braking mode of the brake assembly.
Figure 5:
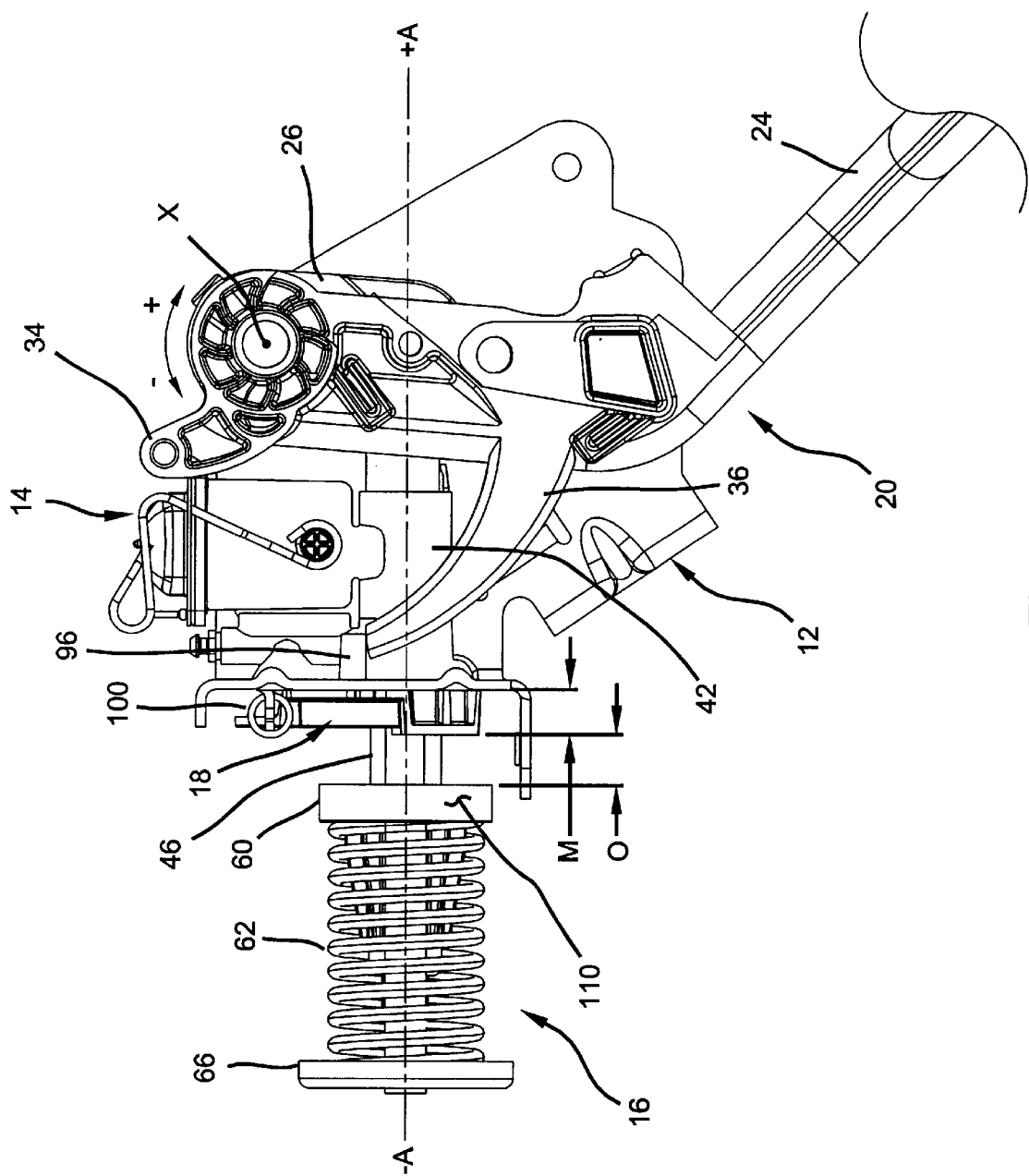
FIG. 5 is a side view of the brake assembly of FIG. 3 with the brake assembly in a braking mode.

The booster arm 18 is a generally curved arm including a pivot aperture 90, an engagement end 92, an extending spring arm 94 and an extending tab 96. The booster arm 1,8 is pivotally supported about the fluid port 54 of the master cylinder 14, extending through the aperture 58 of the support bracket 12, and is pivotal about a pivot axis Y (having positive (+) and negative (−) rotational directions). Although the booster arm 18 is pivotally supported about the fluid port 54, it is anticipated that various structures may be provided for enabling the pivotal support, including the support bracket 12. The tab 96 extends through an arcuate slot 98 of the support bracket 12 and is in selective engagement with the actuation arm 36 of the brake arm 20. A spring 100 is provided for biasing the booster arm 18 in the +Y direction. The spring 100 is anchored between the spring arm 94 of the booster arm 18 and a bracket 102 of the support bracket 12. As shown in FIGS. 3 and 5, during normal operation of the brake assembly 10 (i.e. non-braking and braking modes), the booster arm 18 is in a first position, disposed between the compression plate 60 and the support bracket 12. Thus, the compression plate 60 is offset a distance M (generally defined as a thickness of the booster arm 18) along the retainer bracket 64, in the −A direction, compressing the spring 62 an equivalent distance.

Figure 6:
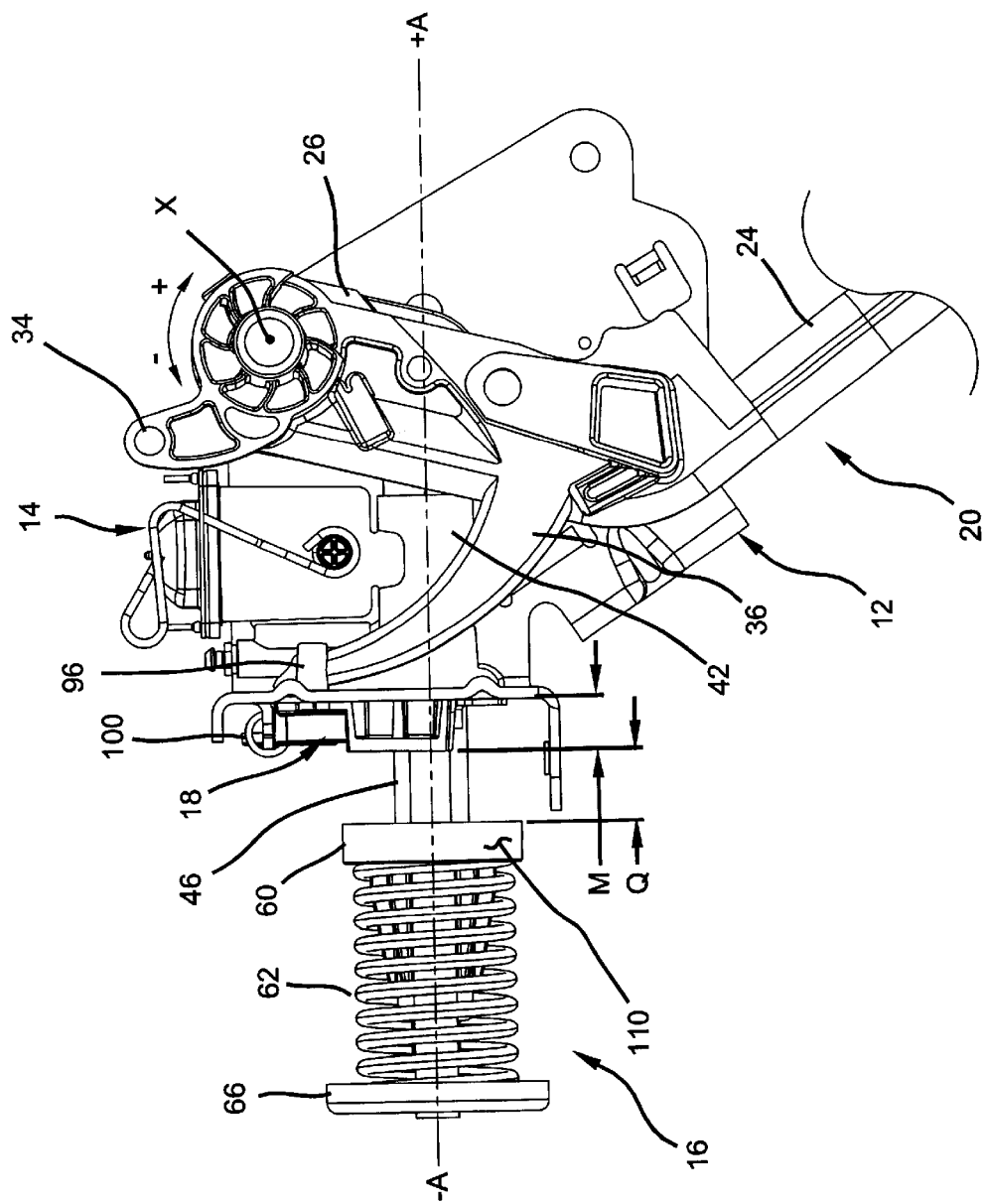
FIG. 6 is a side view of the brake assembly of FIG. 3 with the brake assembly in a park-brake mode.
Figure 7:
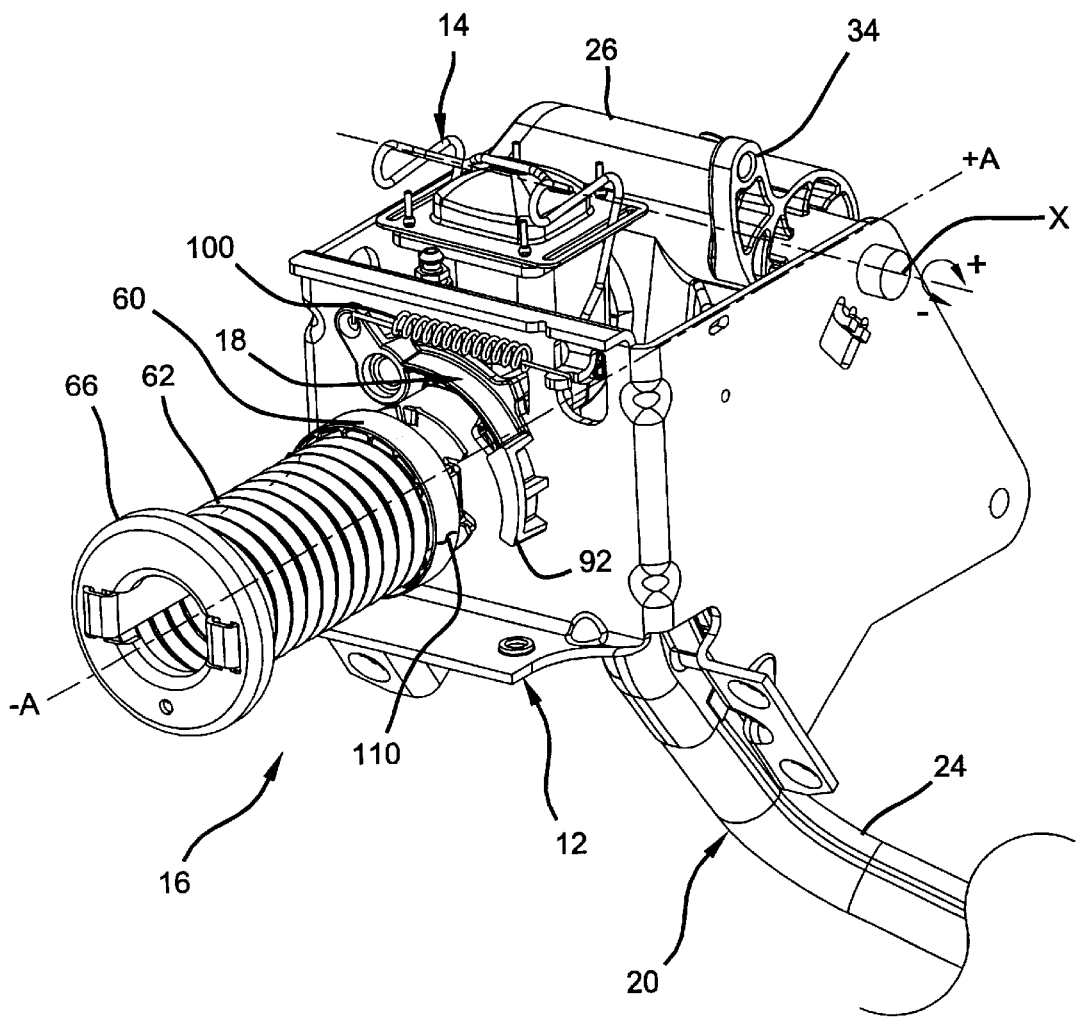
FIG. 7 is a perspective view of the brake assembly in the park-brake mode.
Figure 8:
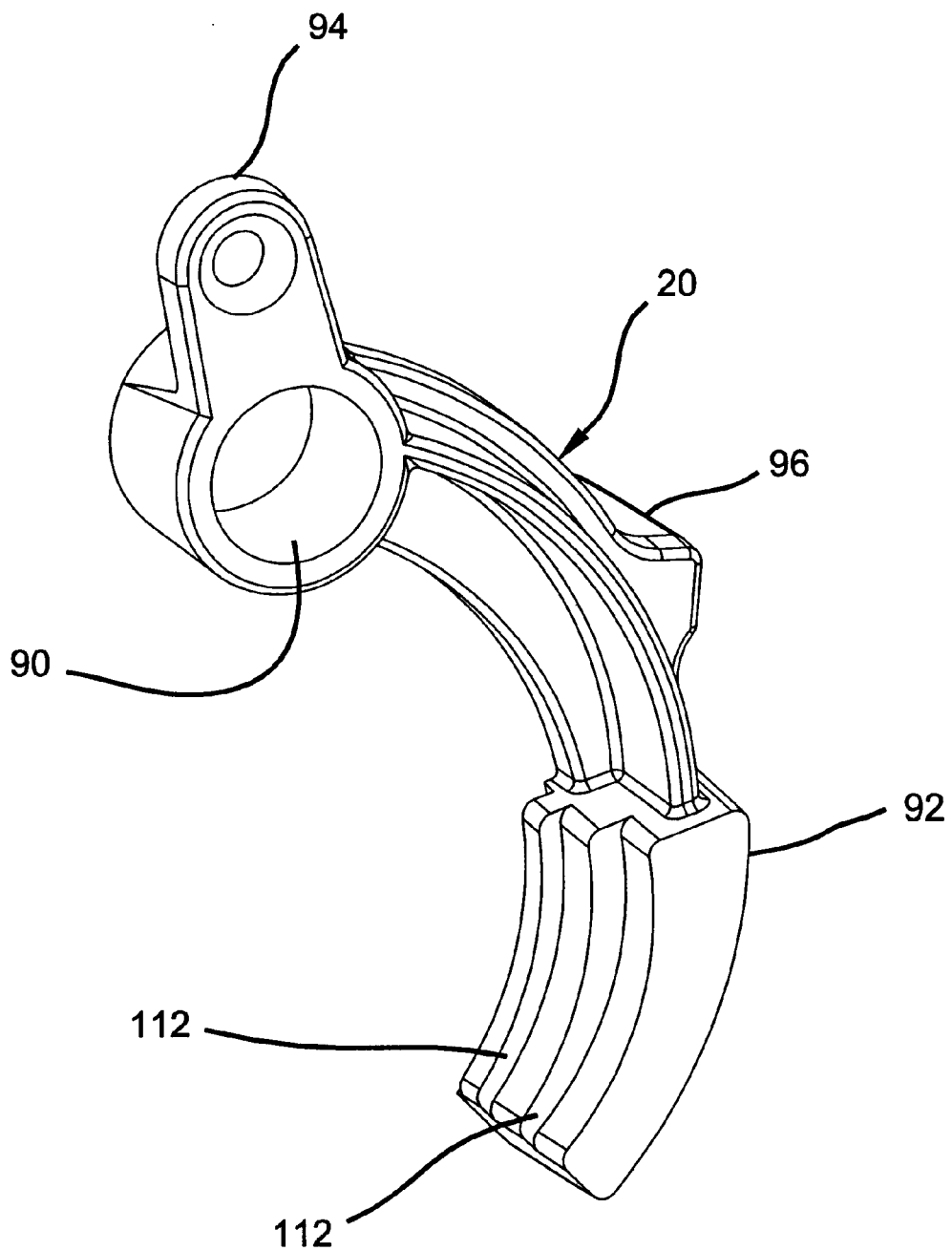
FIG. 8 is a perspective view of a booster arm of the brake assembly.

With reference to FIGS. 3, 5 and 6, the operational modes of the brake assembly 10 will be described in detail. The non-braking mode is depicted in FIG. 3, whereby no force is applied to the brake pedal 28 and thus, the master cylinder 14 is not applying fluid pressure to the brake system 22. The braking mode is depicted in FIG. 5, whereby an external force F (braking force) is applied to the pedal 28 to initiate braking action. The force F causes the brake arm 20 to pivot in the +X direction, whereby the roller 32 presses against the face 40 of the brake piston 44 for sliding the brake piston 44 in the −A direction, a distance N within the cylinder housing 42 (the distance N representing that required for a level of braking). In this manner, the brake piston 44 enables fluid pressure to be applied to the brake system 22.

As fluid pressure builds within the master cylinder 14, movement of the brake piston 44 induces corresponding movement of the accumulator piston 46. Movement of the accumulator piston 46 occurs upon sufficient pressure build up within the master cylinder 14 to overcome the biasing force of the accumulator spring 62, which biases the accumulator piston 46 against movement in the −A direction, through the compression plate 60. Thus, the accumulator piston 46 moves a distance O (proportional to the distance N) in the −A direction, concurrently forcing the compression plate 60 to move the distance O, against the bias of the accumulator spring 62.

At this point, the force F may be either relieved, in which case the brake assembly 10 returns to the non-braking position, or additional force may be applied to lock the brake assembly 10 in the park-brake mode. The park brake mode is generally defined as continuous application of the braking force for a period of time, whereby the park brake latch retains the brake arm 20 in the depressed position. In the park-brake mode, the brake arm 20 is fully pivoted in the +X direction, whereby the roller 32 presses against the face 40 of the brake piston 44 for sliding the brake piston 44 in the −A direction, a distance P within the cylinder housing 42 (the distance P representing that required for park braking). In this manner, the brake piston 44 enables full fluid pressure to be applied to the brake system 22. As fluid pressure builds within the master cylinder 14, movement of the brake piston 44 induces corresponding movement of the accumulator piston 46. Movement of the accumulator piston 46 occurs upon sufficient pressure build up within the master cylinder 14 to overcome the biasing force of the accumulator spring 62, which biases the accumulator piston 46 against movement in the −A direction, through the compression plate 60. Thus, the accumulator piston 46 moves a distance Q (proportional to the distance P) in the −A direction, concurrently forcing the compression plate 60 to move the distance Q, against the bias of the accumulator spring 62. Concurrently, full pivoting of the brake arm 20 enables engagement between the actuation arm 36 and the tab 96 of the booster arm 18, whereby the booster arm 18 is caused to pivot in the −Y direction. In this manner, the engagement end of the booster arm 92 is moved to a second position, removed from its prior position (first position) between the compression plate 60 and the support bracket 12.

As discussed by way of background, implementation of the park-brake mode may be required for numerous reasons including shipping and storage of the vehicle. The environmental influences, again described by way of background, may result in a pressure reduction within the brake system 22. The accumulator assembly 16 compensates for such pressure losses, whereby the compression plate 60 is biased by the accumulator spring 62 against the accumulator piston 46. In this manner, during extended periods, the stored energy of the accumulator spring 62 biases the accumulator piston 46 for maintaining pressure within the brake system 22. In accordance with the brake assembly 10 of the present invention, the accumulator spring 62 is able to bias the compression plate 60 an extended distance over that of prior art systems. More specifically, the compression plate 60 can be biased by the accumulator spring 62 a total distance (Q+M), in the +A direction before bottoming out and becoming ineffective for maintaining pressure in the brake system 22. This is advantageous over prior art brake assemblies which would only enable accumulator assembly actuation of a total distance less than or equal to Q.

In the case of extended park-brake mode implementation, during an extended period of park or storage time (where environmental factors gradually induce a decrease in brake system pressure) the accumulator spring 62 gradually compensates for that decrease by biasing the accumulator piston 46, as described above. In so doing, the accumulator spring 62 extends toward the support bracket 12, thereby reducing the original total distance (Q+M) therebetween. Given sufficient time and sufficient environmental influences, the accumulator spring 62 has the potential to fully extend or sufficiently extend to about, the compression plate 60 against the support bracket 12. After this extended period, an operator may again desire use of the vehicle. Thus, the brake system 10 must be 'reset', whereby the booster arm 18 is again caused to move to the first position between the compression plate 60 and the support bracket 12.

To reset the brake assembly 10, the park-brake mode must be cycled. In the storage scenario described above, after a vehicle has been taken out of storage, the compression plate 60 may be close too or abutting the support bracket 12. After initial deactuation of the park-brake mode, the actuation arm 36 is relieved from engagement with the tab 96 of the booster arm 18 as it returns to its non-braking position, whereby the booster arm 18 is biased to pivot in the +Y direction, towards the first position but ultimately abutting an external circumferential surface 10 of the compression plate 60. Subsequent actuation of the brake assembly in the park-brake mode induces movement of the accumulator piston 46 in the −A direction, further pushing the compression plate 60 against the bias of the spring 62, a distance approximately equivalent to Q, described above. In this position, the accumulator assembly 16 has only limited biasing ability, restricted to the distance Q. However, subsequent deactuation of the park-brake mode again relieves the actuation arm 36 from engagement with the tab 96 of the booster arm 18 as it returns to its non-braking position, whereby the booster arm 18 is again biased to pivot in the +Y direction, towards the first position. This time, however, because the compression plate 60 is already offset the distance Q, there is sufficient space for the booster arm 18 to move into the first position, prior to the compression plate 60 being driven back toward the support bracket. This is possible because the spring biased motion of the booster arm 18 is quicker than the return drive of the compression plate 60 toward the support bracket 18. In short, given the gap Q, the booster arm 18 beats the compression plate 60 and is able to move back to the first position, between the compression plate 60 and the support bracket 12. In this manner, the brake assembly 10 is again in the non-braking mode (i.e. normal position) for further actuation as described hereinabove.

In accordance with an alternative embodiment, the engagement end 92 of the booster arm 18 further includes a series of arcuate steps 112 formed therein. Each step 112 may act as an engagement face for offsetting the compression plate 60 form the support bracket 12. Use of the steps 112 in such a manner is generally limited to situations where air bubbles within the brake system 22 have not fully assimilated thorough the fluid (e.g. a period following initial production). In such situations, during initial actuation in the park-brake mode, the accumulator piston 46 pushed the compression plate 60 the distance less than Q, and perhaps less that the distance M, each of which is described above. Thus, the steps 112 enable partial disposition of the booster arm 18 between the compression plate 60 and the support bracket 12 for providing a level of boosted accumulator piston 46 actuation. However, once the fluid is fully assimilated, the brake assembly 10 operates as detailed herein.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A brake assembly for implementation with a hydraulic brake system, comprising:
    an accumulator piston in fluid communication with the hydraulic brake system to maintain hydraulic pressure therewithin;
    an accumulator assembly operably engaging the accumulator piston and including a compression plate engaging the accumulator piston and an accumulator spring biasing the compression plate against the accumulator piston; and
    a booster arm actuable between first and second positions relative to the compression plate, wherein in the first position the booster arm limits axial movement of the compression plate against the accumulator piston and wherein in the second position the booster arm permits increased axial movement of the compression plate against the accumulator piston.

2. The brake assembly of claim 1, wherein the booster arm is biased in the first position.

3. The brake assembly of claim 1, further comprising a brake arm operably engaging the accumulator piston and selectively engaging the booster arm.

4. The brake assembly of claim 3, wherein the brake arm is actuable through a first range of motion for manipulating axial movement of the accumulator piston and actuable through a second range of motion for manipulating movement of the accumulator piston and pivoting the booster piston toward the second position.

5. The brake assembly of claim 1, wherein a width of the booster arm defines the increased axial movement.

6. The brake assembly of claim 5, wherein the booster arm includes at least one step for defining a second length of the increased axial movement.

7. A brake assembly for implementation with a hydraulic brake system, comprising:
    a support bracket;
    a master cylinder supported by the support bracket and operable to selectively provide hydraulic pressure to the hydraulic brake system;
    an accumulator piston extending from the master cylinder and operable to enable function of the master cylinder, the accumulator piston operable to maintain hydraulic pressure within the hydraulic brake system;
    an accumulator assembly extending from the support bracket, including:
        a compression plate engaging the accumulator piston;
        an end cap; and
        an accumulator spring disposed between the compression plate and the end cap and biasing the compression plate against the accumulator piston; and
    a booster arm pivotally supported by one of the support bracket and the master cylinder, and actuable between first and second positions, wherein in the first position the booster arm limits axial movement of the compression plate against the accumulator piston and wherein in the second position the booster arm permits increased axial movement of the compression plate against the accumulator piston.

8. The brake assembly of claim 7, further comprising a brake pedal pivotally supported by the support plate, the brake pedal selectively operating the master cylinder for providing the hydraulic pressure to the hydraulic brake system.

9. The brake assembly of claim 8, wherein the brake pedal selectively engages the booster arm for movement of the booster arm between the first and second positions.

10. The brake assembly of claim 8, wherein the brake pedal is actuable through a first range of motion for manipulating axial movement of the accumulator piston and actuable through a second range of motion for manipulating movement of the accumulator piston and pivoting the booster piston toward the second position.

11. The brake assembly of claim 7, further comprising a spring for biasing the booster arm in the first position.

12. The brake assembly of claim 7, wherein a width of the booster arm defines the increased axial movement.

13. The brake assembly of claim 12, wherein the booster arm includes at least one step for defining a second length of the increased axial movement.

14. A hydraulically actuated brake system, comprising:
    a brake assembly operable in a first mode for selectively applying brake pressure to components of the brake system and operable in a second mode for continuously applying brake pressure to the components of the brake system, the brake assembly including:
    an accumulator piston in fluid communication with the brake system to maintain hydraulic pressure therewithin;
    an accumulator assembly operably engaging the accumulator piston and including a compression plate engaging the accumulator piston and an accumulator spring biasing the compression plate against the accumulator piston; and
    a booster arm actuable between first and second positions relative to the compression plate, wherein in the first position the booster arm limits axial movement of the compression plate against the accumulator piston and wherein in the second position the booster arm permits increased axial movement of the compression plate against the accumulator piston.

15. The brake system of claim 14, further comprising a spring for biasing the booster arm in the first position.

16. The brake system of claim 14, further comprising a brake arm operably engaging the accumulator piston and selectively engaging the booster arm.

17. The brake system of claim 16, wherein the brake arm is actuable through a first range of motion for manipulating axial movement of the accumulator piston and actuable through a second range of motion for manipulating movement of the accumulator piston and pivoting the booster piston toward the second position.

18. The brake system of claim 14, wherein a width of the booster arm defines the increased axial movement.

19. The brake system of claim 18, wherein the booster arm includes at least one step for defining a second length of the increased axial movement.

* * * * *